April 6, 1948.  G. SIMPSON  2,439,320

MILK BOTTLE COVER

Filed Oct. 21, 1946

Inventor

George Simpson

By Frederick C. Bromley
Attorney

Patented Apr. 6, 1948

2,439,320

UNITED STATES PATENT OFFICE 2,439,320

MILK BOTTLE COVER

George Simpson, Toronto, Ontario, Canada

Application October 21, 1946, Serial No. 704,646

1 Claim. (Cl. 215—101)

My invention appertains to milk bottle covers of the kind employed to replace the conventional pasteboard stopper used in the bottling and delivery of milk.

The invention provides a combination cover adapted to be detachably connected to the mouth portion of a milk bottle to supply a spout for the convenient pouring of the contents and also to supply a closure which will protect the contents from contamination and which can be readily opened for pouring. The closure is a hinged lid, and a distinctive feature of the construction is that the lid is provided with a downwardly inclined prong for removing the pasteboard stopper in applying the cover to a bottle. Another feature of construction is that the spout is provided with an arrangement of guide ribs for precluding milk from dripping down the outside of the bottle in a pouring operation.

Having generally related the nature and objects of my invention other objects and advantages will appear from the ensuing specification considered in conjunction with the accompanying drawing which forms a part thereof.

The drawing is illustrative of a selected embodiment of the invention, in which.

Figure 1:
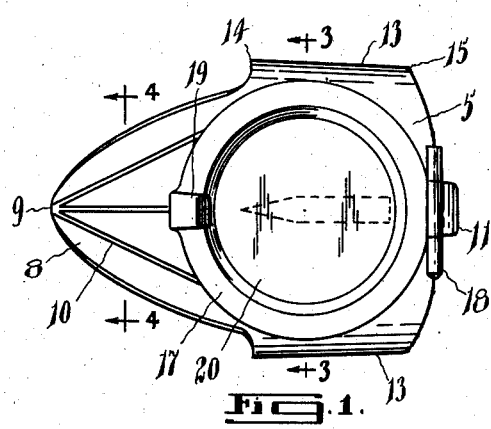
Fig. 1 is a top plan view of the cover showing the lid in closed position.
Figure 4:
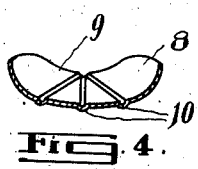
Fig. 4 is a fragmentary aspect of the spout showing the ribs for precluding dripping of milk in the pouring operation.

In carrying out my invention I provide a cover adapted for household use for capping a bottle of milk by substituting it in place of the ordinary paper stopper. The cover comprises a frame or body member 5 of platelike material for seating on the top end face of a milk bottle. This frame or body member is apertured to provide a circular opening in register with the mouth of the bottle and defined by an annular flange 6 integrally depending and suited to fit snugly in the enlarged diameter of the bottle orifice which forms the ledge for the pasteboard stopper 7.

A spout 8 is integrally formed on the member 5 to provide a pouring lip at a side of the bottle, which extends outwardly on a slight upward slope and is of a substantially convexo-concave shape in cross section for guidance of the flow of the liquid to the narrow discharge end 9 in the pouring operation. On the bottom face of said lip there is provided a plurality of ribs 10 which converge to the discharge end 9 and extend from the bead of the bottle. Said ribs are shown as being struck from the bottom face of the spout as by stamping dies, which incidently form grooves in the top face of the spout.

At the side of the opening opposite the spout the member 5 is provided with a fixedly depending finger 11 for abutting the bead 12 on the bottle in order to limit the forward movement of the cover in attaching the same as hereinafter more clearly explained.

The means for attaching the cover to the bottle is shown as comprised of a pair of diametrically disposed clips 13 which are integrally fashioned on the member 5 at opposite sides thereof. These clips are each curved downwardly and inwardly to fit over the bead 12 and they have a slight divergency throughout their length so that their front ends 14 are somewhat larger than their rear ends 15, which facilitates engagement with the bead in placing the cover on the bottle. To further facilitate the engagement the front and rear ends 14 and 15, respectively, of each clip are downwardly sloped toward the bottom edge 16 thereof.

A closure 17 in the form of a lid is provided on the member 5 to close the opening therein. The lid is hinged to the rear portion of the member 5 as at 18 and is provided with a forwardly disposed finger rest 19 which rigidly upstands for applying finger pressure on the lid to hold it closed while the cover is being applied to the bottle. Said lid has a central depressed part 20 for fitting within the depending flange 6 of the opening of the cover.

On the lid there is provided a pointed prong 21 which extends forwardly and downwardly from the bottom face thereof for removal of the stopper 7.

Figure 2:
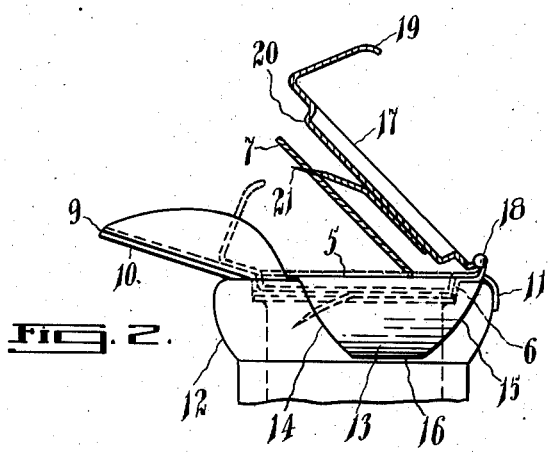
Fig. 2 is a side elevation, partly in section, of the cover attached to a milk bottle showing how the stopper remover is used.
Figure 3:
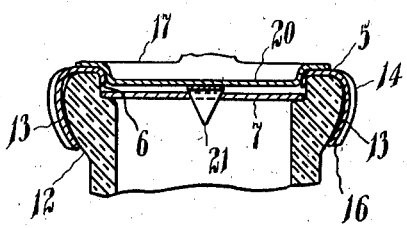
Fig. 3 is a cross section on line 3—3 of Fig. 1.

To place the cover on the bottle it is grasped in the hand by gripping one of the clips with the thumb and gripping the other clip with the second finger of the hand and at the same time placing the index finger on the finger rest 19 to hold the lid in closed position. The cover is then slid forwardly onto the bottle by holding it at an angle to the mouth thereof initially, which enables the prong 21 to pass over the bead 12 as it is lowered into piercing engagement with the stopper. The clips securely clamp the cover as it is brought to fully seated position on the mouth and the stop piece 11 limits its forward movement. The lid is now opened in order to pull the stopper from the bottle as shown in Fig. 2, whereupon it can be removed from the prong and discarded. The lid is then closed to seal the bottle. Milk can be poured at will by tilting the bottle which automatically opens the lid. Milk does not drip down the outside of the bottle in the pouring operation because any drops will cling to the ribs 10 and run into the stream of milk spouting from the lip in a pouring operation.

The advantages and utility of the invention will be manifest from the preceding description and it will be understood that such changes and modifications of the construction may be resorted to as come within the scope of the subjoined claim.

What I claim is:

A cover of the class described comprising a body member of ring-like configuration for seating on the top end face of a milk bottle and providing an opening for registering with the mouth of the bottle, said member being formed with a flange around said opening and being formed with a pouring lip at a side of said opening, a lid for said opening, said lid being hinged to said member at the opposite side of said opening for swinging away from said pouring lip, a pair of diametrically opposite clips formed on said member laterally of said pouring lip, said clips being curved downwardly and inwardly to engage the bead on the bottle, said clips having a curvature which is enlarged through their length toward said pouring spout to enable the cover to be applied by holding it at a downward angle to the top of the bottle and sliding it forwardly thereon to engage said clips with said bead, and a pointed prong centrally depending from said lid for forwardly projecting into said bottle mouth at an angle so that when the lid is held closed in the application of the cover the prong will angularly engage the pasteboard stopper to remove the stopper as the lid is raised.

GEORGE SIMPSON.

REFERENCES CITED

The following references are of record in the file of this patent:

UNITED STATES PATENTS

| Number | Name | Date |
|---|---|---|
| 886,925 | Betts | May 5, 1908 |
| 1,027,421 | Jungclass | May 28, 1912 |
| 1,101,351 | Suit | June 23, 1914 |
| 1,166,209 | Hoffman | Dec. 28, 1915 |
| 1,242,994 | Skiff | Oct. 16, 1917 |
| 1,387,014 | Saul | Aug. 9, 1921 |
| 1,446,474 | Mahnken | Feb. 27, 1923 |
| 1,556,127 | Pruett | Oct. 6, 1925 |
| 1,597,238 | Maddox | Aug. 24, 1926 |
| 1,695,396 | Traub | Dec. 18, 1928 |